United States Patent

Loeble

[15] 3,648,562
[45] Mar. 14, 1972

[54] SAFETY CAM PIN ASSEMBLY

[72] Inventor: August F. Loeble, 800 Woodlawn Avenue, Collingdale, Pa. 19023

[22] Filed: Apr. 28, 1970

[21] Appl. No.: 32,626

[52] U.S. Cl. ................................................89/185, 89/148
[51] Int. Cl. ..........................................................F41d 11/16
[58] Field of Search ....................42/70 F; 89/148, 172, 179, 89/185

[56] References Cited

UNITED STATES PATENTS 1,502,676  7/1924  Kewish .................................89/172

Primary Examiner—Benjamin A. Borchelt
Assistant Examiner—Stephen C. Bentley
Attorney—Edelson and Udell

[57] ABSTRACT

A safety cam pin assembly for replacing the standard cam pin of automatic rifles of the M-16 type, the safety cam pin assembly consisting of a modified cam pin and an obstruction safety bushing. The modified cam pin is the same as a standard cam pin with the exception that the lower portion of the cam pin shank is of reduced diameter by an amount equal to twice the wall thickness of the safety obstruction bushing, and a keyway is provided on the cam pin. The safety obstruction bushing is a sleeve which slips upward over the reduced lower portion of the modified cam pin and is provided with key elements to interfit with the keyway of the cam pin so that when the key and keyway are interfitted the bushing is rotatable with the cam pin. The sidewalls of the obstruction bushing are diametrically apertured with two sets of orthogonally disposed apertures, one set of such apertures being alignable with the firing pin aperture through the cam pin and of sufficient diameter to permit passage of the firing pin therethrough. The second set of apertures are of reduced cross section and do not permit passage of the firing pin entirely therethrough and thereby prevent the firing pin from reaching a round of ammunition when the cam pin has been omitted from the bolt assembly. Detent means are provided to retain the safety obstruction bushing in its firing pin obstructing position until such time as the cam pin is properly reinstalled into the bolt assembly.

19 Claims, 15 Drawing Figures

Patented March 14, 1972
3,648,562
3 Sheets-Sheet 1
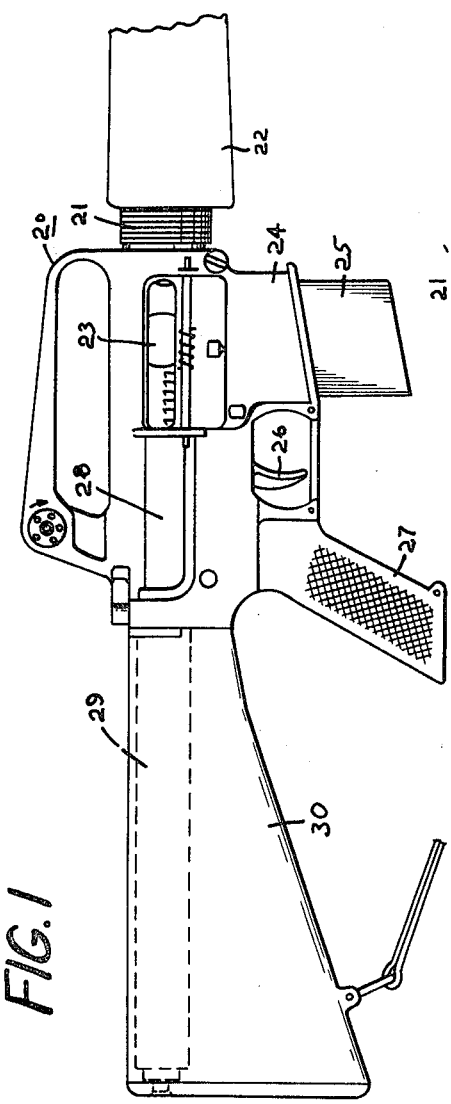
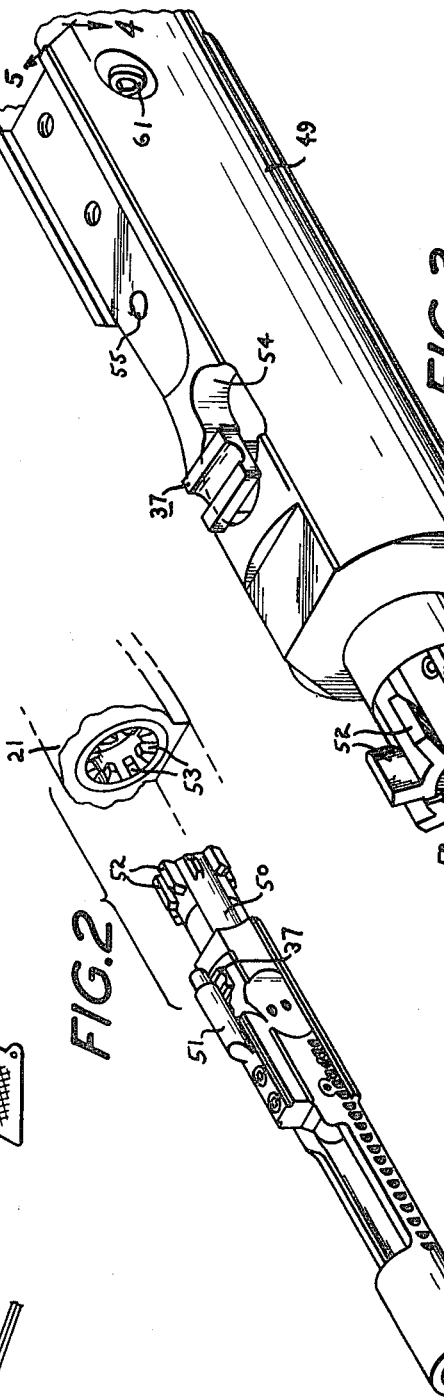
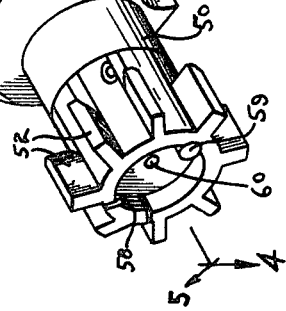
INVENTOR
AUGUST F. LOEBLE
BY
Edelson and Udell
ATTORNEYS.

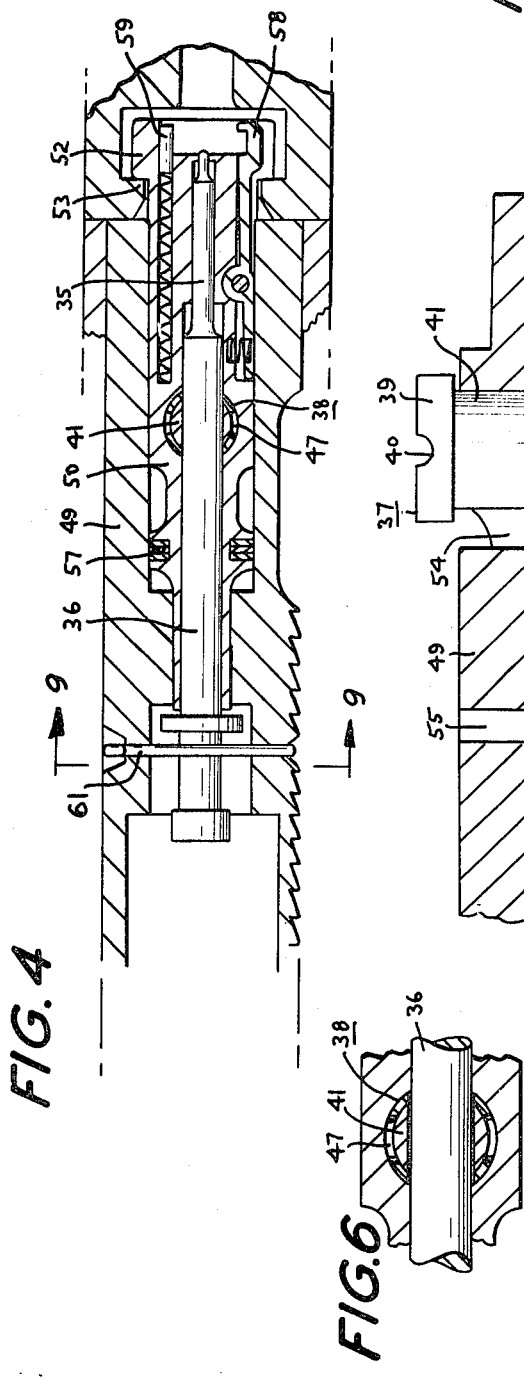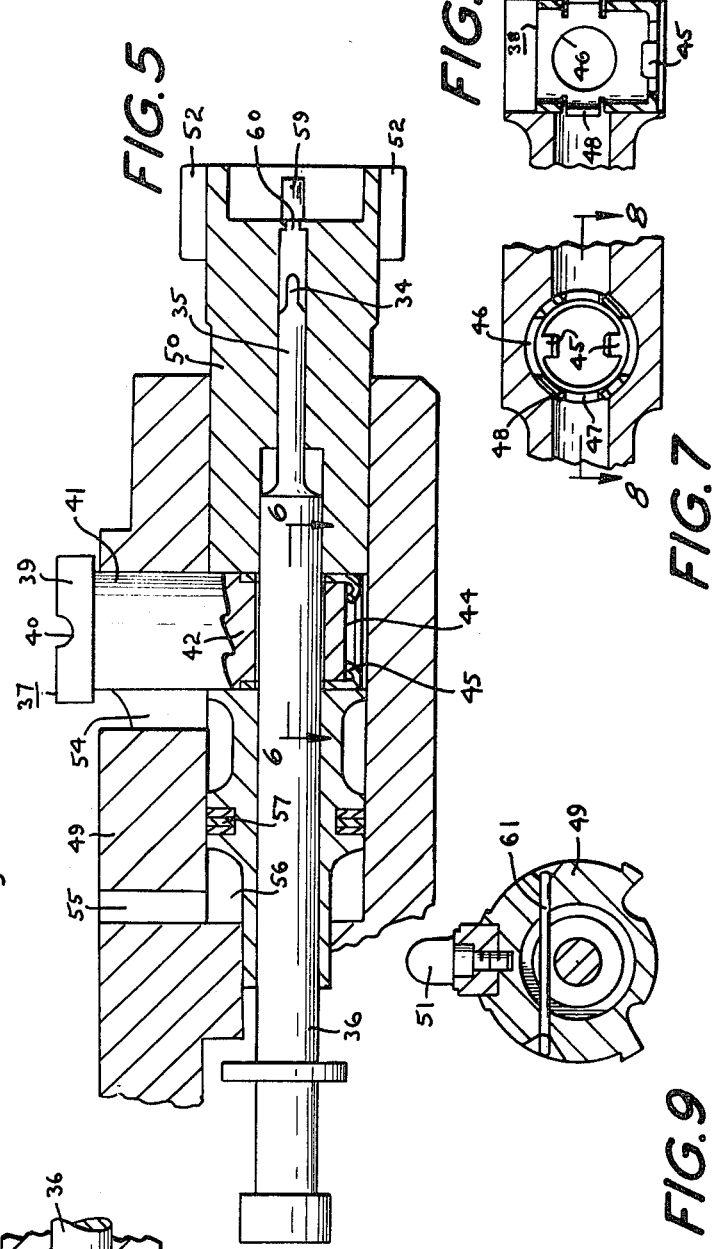

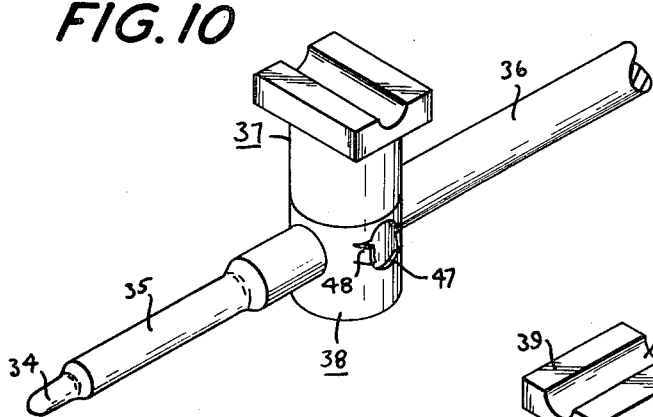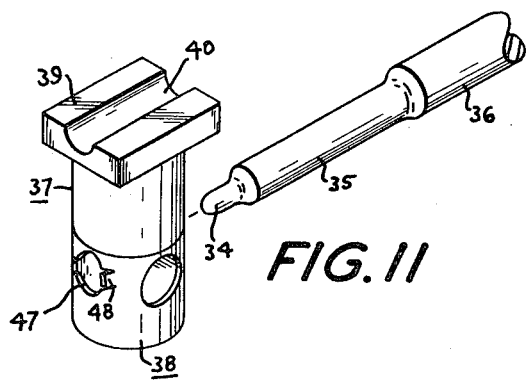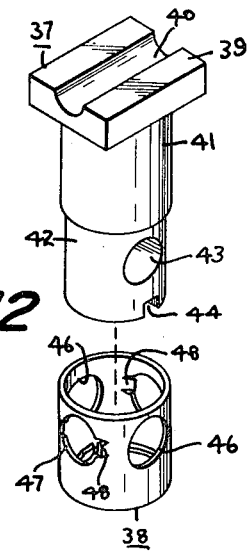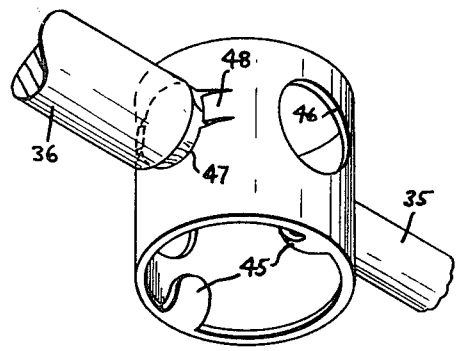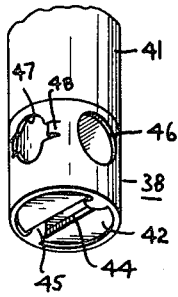

SAFETY CAM PIN ASSEMBLY

This invention relates generally to a safety device for rifles, and more particularly relates to a device which prevents the discharge of the rifle in the event that the rifle breech is unlocked.

Rifles which are provided with magazines containing a number of rounds of ammunition and which automatically eject the cartridge of a fired round and chamber a new round are provided with mechanisms which cause the rifle bolt to unlock and retract from the firing chamber to thereby cause ejection of the spent cartridge and to then move forward and pick up the new round and relock into the firing chamber. In the M–16 rifle used extensively by the Armed Forces of the United States, and its nonautomatic commercial equivalent the AR–15, the locking and unlocking of the rifle bolt is effected by a part known as the bolt cam pin which is carried by the rifle bolt and extends through a guiding cam slot in the bolt holder within which the rifle bolt moves.

The construction of the rifle is such that is is possible to disassemble the gun for cleaning and to then reassemble the gun, chamber a round of ammunition and fire the gun even if the bolt cam pin has not been replaced in the rifle. The failure to replace the cam pin prevents the bolt from locking into the breech so that if in such a circumstance the gun is fired there is nothing to prevent the explosive force of the discharging round of ammunition from violently driving the entire bolt assembly rearward in the gun and causing the rifle to explode. The existence of this situation has been recognized by the Department of the Army by the printing of a warning in its technical manual covering the operation and maintenance of the M–16 and M–16A1 rifles, the Army Technical Manual being identified as TM-9-1005-249-12 dated Aug. 2, 1968.

Tests have shown that rifles which have been deliberately exploded by omission of the cam pin have exploded in different ways, all violent, and all likely to produce a serious injury to the person firing the weapon. In all tests the entire magazine with its rounds of ammunition has been violently blown out of the bottom of the magazine holder. In some tests flame jets have appeared at the cartridge ejection port and at the bottom of the magazine holder. The rifle stocks have been blown rearwardly off of the gun, in some cases taking the entire rear end of the rifle with it. The cartridge case in most instances is fragmented and blown out of the gun through various apertures such as the ejection port and the magazine holder.

The present invention completely eliminates the explosion hazard by preventing the rifle from being fired if the cam pin has not been replaced in the gun. This is accomplished by replacement of the standard rifle cam pin by a two part safety cam pin assembly which includes a modified cam pin and a safety obstruction bushing. The design of the assembly is such that the safety obstruction bushing remains in the rifle bolt even when the gun is disassembled for cleaning purposes, and when so disassembled the safety obstruction bushing is positioned within the bolt so that the firing pin of the rifle is prevented from passing through the bolt to a live round of ammunition in the event that the gun should be reassembled with the modified cam pin omitted.

However, when the modified cam pin is reassembled into the bolt in the normal and usual manner, the safety obstruction bushing permits the rifle firing pin to function in its normal manner for firing the weapon. Accordingly, it is a primary object of this invention to provide a safety cam pin assembly which prevents a rifle from being fired in the event that the cam pin is not installed in the rifle to thereby prevent the latter from exploding and seriously injuring the shooter.

Another object of the invention is to provide a novel safety cam pin assembly including a modified cam pin and a safety obstruction bushing which functions conjointly as a normal cam pin when properly installed, and which prevents firing of the rifle in the event that the modified cam pin portion is omitted from the gun.

A further object of the invention is to provide a novel safety cam pin assembly as aforesaid which can be quickly and easily installed in a rifle in a very few minutes, in the field, and requiring for such installation nothing more than the removal of the standard cam pin and insertion of the safety cam pin assembly.

The foregoing and other objects of the invention will become clear from a reading of the following specification in conjunction with an examination of the appended drawings, wherein:

FIG. 1 is a side view of an M–16 from the right side;

FIG. 1A is an enlarged perspective view of a standard cam pin used in the M–16 and AR–15 rifles;

FIG. 2 is a perspective view of the bolt carrier and bolt assembly of the rifle spaced backward from the rear end of the firing chamber of the gun;

FIG. 3 is an enlarged perspective view of the rifle bolt, cam pin and forward portion of the bolt carrier as would be seen when looking at the front end of the bolt;

FIG. 4 is a horizontal longitudinal section through the bolt and bolt carrier assembly as taken in the position indicated by the lines 4—4 on FIG. 3, but with the bolt in locked position within the firing chamber, in which case the cam pin would be disposed at the rear of the cam slot;

FIG. 5 is a vertical sectional view through the bolt and a portion of the bolt carrier on an enlarged scale as would be seen when viewed along the line 5—5 of FIG. 3, this position of the bolt within the bolt carrier corresponding to the unlocked condition of the breech with the cam pin positioned at the forward end of the cam slot;

FIG. 6 is an enlarged horizontal section through the safety cam pin assembly and firing pin as would be seen when viewed along the line 6—6 of FIG. 5;

FIG. 7 is a view similar to FIG. 6 but with the firing pin and modified cam pin removed and with the obstruction safety bushing rotated through 90°;

FIG. 8 is a vertical section through a portion of the bolt within which is disposed the obstruction safety bushing with the modified cam pin removed as would be seen when viewed along the line 8—8 of FIG. 7;

FIG. 9 is a vertical cross section through the bolt carrier as would be seen when viewed along the line 9-9 of FIG. 4 illustrating the firing pin retainer pin which retains the firing pin in proper position within the bolt;

FIGS. 10 to 14 are a sequence of perspective views showing the safety cam pin assembly in various positions of assembly and disassembly, and in differing positions illustrating normal cam pin firing function disposition and firing pin obstruction bushing with the modified cam pin removed.

In the following description, like elements are denoted by like reference characters.

Turning now to the drawings and considering first FIG. 1 there is shown a rifle designated generally as 20 having a firing chamber region 21 from which forwardly extends the rifle barrel enclosed within hand guards 22. Rearward of the firing chamber 21 is cartridge ejection port 23 below which is disposed the magazine holder 24 and within which is disposed a magazine 25. Behind the magazine holder 24 is the trigger 26, to the rearward of which is located the pistol grip handle 27. Above the trigger and handle is the bolt assembly receiver region 28 within which is disposed the bolt and bolt carrier assembly to be described hereinafter. Secured to and extending rearward from the bolt assembly receiver 28 is the buffer tube assembly 29 which is also disposed internally within the rifle stock 30 and to which the rifle stock is secured.

FIG. 1A illustrates on an enlarged scale a standard cam pin which is normally supplied with the M–16 or AR–15 rifles. It is this part which when omitted from the bolt assembly results in an exploded rifle, and it is this part which the present invention replaces. The cam pin is basically a piece of hardened steel having a cylindrical shank 31 surmounted by a rectangular head 32, and having formed through the cylindrical shank and orthogonal to the cylindrical axis a bore 33 through which the firing pin of the rifle extends when the gun is in its assembled condition. The cylindrical shank 31 of the standard cam pin is of constant diameter from the top to bottom and in this aspect differs from the modified cam pin to be hereinafter described.

Digressing momentarily now refer to the showings of FIGS. 11, 12 and 13 which show in perspective views the safety cam pin assembly and a portion of the firing pin of the rifle. The firing pin, it should be noted, has a striking tip 34 formed at the end of a cylindrical portion 35 of small diameter which enlarges at its opposite end to a cylindrical portion 36 of larger diameter. As best seen in FIG. 12, the safety cam pin assembly consists of two parts, a modified cam pin designated generally as 37 and a safety obstruction bushing designated generally as 38. The modified cam pin 37 has a rectangular head 39 of the same length, width and height as the rectangular head 32 of the standard cam pin shown in FIG. 1A, the upper surface of the head 39 however being provided with a semicylindrical groove 40 to be hereinafter described more fully.

Extending downward from the rectangular head 39 is the shank of the cam pin consisting of an upper cylindrical section 41 of the same diameter as the cylindrical shank 31 of the standard cam pin, and a lower cylindrical section 42 depending coaxially from the upper cylindrical section 41 and being of a slightly reduced diameter on the order of approximately 30/1,000 of an inch (0.030 inch) which corresponds exactly to accommodate the 15/1,000 of an inch (0.015 inch) wall thickness of the safety obstruction bushing 38. It should be noted that the upper cylindrical section 41, as best seen in FIG. 5, extends downward into the bolt 50 substantially below the interface between the bolt 50 and bolt carrier 49, so that when the bolt cam pin 37 bottoms in the cam slot 54 the full diametrical cross section of the cam pin takes the impact, and not the reduced diameter lower section 42. The lower cylindrical section 42 is formed with a transverse bore 43 of exactly the same size and orientation as the firing pin bore 33 of the standard cam pin. The bottom of the lower cylindrical section 42 is provided with a transversely extending slot 44 within which are normally disposed the upwardly turned key tabs 45 which extend upward from the lower perimetral edge of the cylindrical sleeve safety obstruction bushing 38.

The obstruction bushing sleeve 38 is close fittingly disposable on the lower cylindrical section 42 of the modified cam pin and is provided with a pair of coaxially aligned diametrically opposed circular apertures 46 which are the same size as and exactly aligned with the cross-sectional openings of the opposite ends of the bore 43 when the key tabs 45 are disposed within the cam pin bottom slot 44. This arrangement is clearly shown in FIGS. 11 and 14, and in such interfitted condition, the larger diameter cylindrical portion 36 of the firing pin is projectable through both of the assembled parts of the safety cam pin assembly.

As seen for example in FIG. 10 the safety bushing 38 is also provided with a second pair of diametrically opposed apertures 47 designated as obstruction apertures and which are spaced at 90° about the periphery of the obstruction bushing sleeve from the circular apertures 46. Turned out from opposite sides of each of the obstruction apertures 47 are detent tabs 48 whose function is to retain the obstruction bushing within the bolt in properly indexed position to permit cleaning of the bolt but prevent passage of the firing pin whenever the modified cam pin 37 has been removed from the bolt, all as will become clear from the description of FIGS. 2 through 8 to which attention should be now directed.

In FIG. 2 there is seen the bolt carrier 49 within which is disposed the bolt 50, a portion of which bolt extends forward out of the bolt carrier 49. Secured on the upper surface of the bolt carrier 49 is the bolt carrier key 51 which functions as part of the automatic cycling firing system of the weapon. At the forward end of the bolt 50 are a plurality of bolt lugs 52 spaced peripherally about the outer edge of the bolt and which engage behind and lock with the firing chamber lugs 53 formed at the rear end of the firing chamber 21 at the rear end of the rifle barrel.

As best seen in FIG. 3, the bolt carrier 49 is formed with a cam slot 54 through which is downwardly projected into the bolt 50 the standard cam pin as shown in FIG. 1A or the safety cam pin assembly including the modified cam pin 37 as shown in FIG. 3. As seen in FIG. 3, the bolt carrier key 51 has been removed to disclose a gas port 55 which extends downward through the bolt carrier 49 into a chamber 56 disposed just to the rear of the bolt compression rings 57, as best seen in FIG. 5.

The front end of the bolt has a recessed central region within which the primer end of a cartridge is seated with the rim of the cartridge caught beneath the overhang of the extractor 58. With a cartridge operatively seated in the front of the bolt, the ejector pin 59 would be driven inward against its spring, but in the showings of the figures without such a cartridge the ejector pin is illustrated in its outer position. The center of the face of the bolt cartridge seat is of course provided with a central firing pin aperture 60 through which the firing pin striking tip 34 is projectable for striking the cartridge primer. The firing pin retainer pin 61 extends transversely through the bolt carrier 49 to retain the firing pin in proper installed position as is more clearly seen in the showings of FIGS. 4 and 9.

As best seen from FIG. 2, it will be appreciated that the bolt 50 can only move into and out of engagement with the firing chamber 21 to respectively close the chamber and open the chamber when the bolt lugs 52 slide forward and rearward between the firing chamber lugs 53. Additionally, when a live round of ammunition is chambered by movement of the bolt forward, it is then necessary to insure that the bolt is locked into the chamber and cannot move rearward when the round of ammunition is fired. If the bolt 50 were not so restrained it would be driven violently rearward destroying the rear end of the gun in an explosive fashion. For this reason, when the bolt lugs 52 pass forward just beyond the firing chamber lugs 53, the entire bolt 50 is rotated to cause the lugs 52 to be disposed behind the lugs 53 and thus lock the bolt into the firing chamber. The rotation of the bolt 50 is caused by the movement of the cam pin 37 within the cam slot 54 of the bolt carrier 49. The locked condition of the bolt is shown in the cross section of FIG. 4 while the unlocked condition of the bolt is shown in FIG. 5.

Assuming that a round of ammunition has been chambered and that the bolt is locked as shown in FIG. 4, and that the gun is then discharged, the sequence of events is as follows. As the bullet is projected forward out of the barrel of the gun the expanding gases move forward in the rifle barrel until they encounter a gas feedback tube (not shown) which drives a portion of the expanding gases backward through a side channel and into the bolt carrier key 51 mounted atop the bolt carrier 49. These expanding gases move through the bolt carrier key and down through the gas port 55 into the inside of the bolt carrier 49 and the chamber 56 surrounding the reduced diameter portion of the bolt 50 just rearward of the bolt compression rings 57.

The build up of gas pressure in chamber 56 drives the bolt carrier 49 rearward while holding the bolt 50 forward. As the bolt carrier 49 moves rearward the cam pin 37 is rotated by the cam slot 54 to thereby cause the bolt 50 to rotate so that the bolt lugs 52 shift from behind the firing chamber lugs 53 and into the slots therebetween. As the bolt carrier 49 continues to move rearward under the pressure of the expanding gases the cam pin 37 bottoms at the forward end of the cam slot 54 so that the bolt 50 is also now carried rearward along with the bolt carrier 49. As soon as the fired cartridge case is retracted to the region of the ejection port 23 it is ejected by the ejector pin 59 so that a new round of ammunition can thereafter be shifted upward from the magazine 25 to be carried forward and chambered when the bolt carrier 49 has reached the limit of its rearward travel and thereafter starts forward again.

The bolt carrier 49, as it moves rearward, compresses a spring in the buffer tube system 29, so that when the gas system self-vents and discharges the gas pressure which has been forcing the bolt carrier rearward, the spring of the buffer tube system drives bolt carrier 49 forward to thereby cause the new round of ammunition to be picked up by the front of the bolt 50 and pushed into the firing chamber. The bolt and bolt carrier move forward in a straight line so that the bolt lugs 52 again slip between the firing chamber lugs 53 and are in position to be rotated therebehind to again lock the bolt as the bolt carrier 49 continues its forward movement to again rotate the cam pin 37 through the rotative action of the cam slot 54.

In the event that after disassembly of the rifle, the rifle is reassembled without the cam pin it should now be clear that when the bolt moves forward to chamber a round of ammunition and the bolt lugs 52 slip between the firing chamber lugs 53 there is nothing to cause the bolt 50 to rotate, and the bolt lugs 52 will remain disposed between the firing chamber lugs 53 and will not have rotated therebehind to lock the breech. When thereafter the rifle is discharged the full explosive force of the cartridge will drive rearward against the entire bolt assembly and destroy the gun with probable serious injury to the person firing the weapon. From the showing of FIGS. 4 and 5 it is clear that omission of the normal cam pin permits the firing pin to be installed in the bolt and thereafter permits the gun to be fired.

This condition cannot occur with the safety cam pin assembly according to the invention as will be understood from a consideration of FIGS. 10 through 14 to which attention should now be directed. FIG. 10 represents the condition of the safety cam pin assembly disposed within the bolt assembly in the normal manner corresponding to the showings of FIGS. 4, 5 and 6. From this showing it will be clear that the firing pin projects through the cam pin in the normal fashion for firing. When it is desired to disassemble the bolt assembly, perhaps for cleaning, the firing pin retainer pin 61 is first removed so that the firing pin itself may be dropped rearwardly out of the bolt and the bolt carrier. With the firing pin removed, it is possible to rotate the safety cam pin assembly through 90 degrees so that it may be slipped upward out of the bolt. It is necessary to so rotate the cam pin since otherwise the rectangular head will not clear out from underneath the bolt carrier key 51.

FIG. 11 illustrates the condition where the firing pin has been removed and the cam pin assembly has been rotated 90 degrees and is still within the bolt assembly. In this position the modified cam pin 37 may be readily slipped up outward from the bolt assembly. However, the safety obstruction bushing 38 remains in the bolt 50 as shown in the detail views of FIGS. 7 and 8. From these latter figures it will be observed that 90 degree rotation of the safety cam pin assembly caused the obstruction apertures 47 to be rotated into alignment with the firing pin channel through the bolt, and in this position the detent tabs 48 of the obstruction bushing obstruction apertures 47 have detented into the firing pin channel and hold the obstruction bushing 38 in position so that it neither rotates or moves transversely to the bolt 50. If now the bolt assembly is reassembled and the modified cam pin is not reinstalled, the obstruction apertures 47 are aligned with the firing pin channel and, as shown in FIG. 13, while the small diameter portion 35 of the firing pin can pass through the obstruction apertures 47, the large diameter portion 36 of the firing pin cannot so pass and consequently the firing pin cannot be installed into the bolt to its normal position for replacing the firing pin retainer pin 61.

If the obstructed firing pin is forced forward in an attempt to properly position it, it pushes the bolt 50 out of the front of the bolt carrier 49 and it thereupon becomes immediately apparent to the person reassembling the weapon that the cam pin has been forgotten. If the firing pin is not forced forward, then the gun may be closed if it is an AR-15 but the firing pin is not permitted to reach the chambered round of ammunition and the gun cannot be fired. If the gun is an M-16 automatic weapon any attempt to close the gun with the firing pin in a rearwardly displaced position will prevent closure and again it will be immediately apparent that the cam pin has been omitted. While the obstruction apertures 47 are sized to prevent passage of the firing pin to an operative position, these apertures are large enough to permit complete and proper cleaning of the bolt by passage of the cleaning device therethrough.

When after cleaning, the modified cam pin is replaced, it is moved downward through the cam slot 54 and into the cam pin bolt hole until it seats into the safety obstruction bushing with the key tabs 45 of the latter disposed within the slot 44 of the modified cam pin. When now the modified cam pin 37 is rotated through 90° the obstruction apertures 47 are rotated out of the firing pin channel and the full sized circular apertures 46 are rotated into alignment therewith so that the firing pin may then be properly installed into the bolt assembly in functional position for firing.

As may be surmised, the head of the cam pin is somewhat obstructed by the bolt carrier key 51 and is not readily munipulated for rotation and extraction. For this reason, a shallow groove 40 is machined in the top surface of the modified cam pin head 39 so that a pin may be laid therein for easy rotation of the cam pin to thereby facilitate removal. The small diameter portion 35 of the firing pin has been found to be suitable for this purpose and can be so used if desired.

Having now described my invention in conjunction with a particularly illustrated embodiment thereof, modifications and variations of the invention may now occur from time to time to those persons normally skilled in the art without departing from the essential scope or spirit of the invention, and accordingly it is intended to claim the same broadly as well as specifically as indicated by the appended claims.

What is claimed is:

1. A safety cam pin assembly for automatic rifles of the type having a bolt which reciprocates within a bolt carrier and which latter is formed with a cam slot within which the cam pin rides to rotate the bolt between locked and unlocked conditions, and in which the bolt is formed with a firing pin channel extending longitudinally therethrough and a cam pin receiving bore alignable with the cam slot and extending intersectingly transversely to the firing pin channel, said safety cam pin assembly comprising in combination,
   a. a cam pin projectable through the bolt carrier cam slot into and movable within the cam receiving bore of the bolt, said cam pin having a firing pin bore therethrough alignable with the firing pin channel of the bolt, said cam pin bore permitting passage of the firing pin through said cam pin when said bore and firing pin channel are aligned,
   b. a firing pin obstruction device disposable within the bolt effective to permit passage of the firing pin through the bolt when said obstruction device is in a first position to allow normal firing of the rifle, and effective to prevent passage of the firing pin through the bolt to the firing chamber when said obstruction device is in a second position, and
   c. interfitting key means comprising a first part associated with said cam pin and a second part associated with said obstruction device whereby said cam pin and obstruction device are interengageable, and when so interengaged, said obstruction device is moved into its said first position by said cam pin when the latter is positioned to align its firing pin bore with the bolt firing pin channel as aforesaid, and said obstruction device is moved into its said second position when said cam pin is shifted into position to be removed from the bolt.

2. A safety cam pin assembly as described in claim 1 wherein said cam pin and said obstruction device are separable one from the other.

3. A safety cam pin assembly as described in claim 1 wherein said cam pin and said obstruction device are separable from one another and said obstruction device further includes retention means engageable with the rifle bolt which retain said obstruction device in the bolt in its second position when said cam pin is removed from the bolt.

4. A safety cam pin assembly as described in claim 1 wherein said obstruction device comprises a sleeve which slips upward over the lower end of said cam pin.

5. A safety cam pin assembly as described in claim 1 wherein said cam pin comprises a cylindrical shank, and said obstruction device comprises a cylindrical sleeve which slips upward over the lower end of said cam pin, said key means being formed at the lower ends of both said cam pin and obstruction device and interfitting when said sleeve is slipped onto said shank, said cam pin being separable from said sleeve by axial movement of said cylindrical shank.

6. A safety cam pin assembly as described in claim 1 wherein said cam pin comprises a shank having an upper section and a lower section, said upper section being projectable through the bolt carrier cam slot and extending close fittingly downward for a distance into the cam pin receiving bore of the bolt, said lower section extending coaxially downward from and being of smaller cross section than said upper section and having formed therein said firing pin bore, said obstruction device comprising a sleeve which slips close fittingly upward over said lower section of said cam pin, said sleeve being provided with at least a first firing pin aperture so that when said obstruction device is in its said first position the said first firing pin aperture aligns with said cam pin firing pin bore and the bolt firing pin channel to permit full passage of the firing pin for firing condition, and when said obstruction device is in its said second position the said first firing pin aperture does not align with the bolt firing pin channel.

7. A safety cam pin assembly as described in claim 1 wherein said obstruction device comprises a sleeve which slips upward over the lower end of said cam pin, said sleeve being provided with at least a first firing pin aperture and a second firing pin aperture so that when said obstruction device is in its said first position the said firing pin aperture aligns with said cam pin firing pin bore and the bolt firing pin channel to permit full passage of the firing pin for firing condition and when said obstruction device is in its said second position the said second firing pin aperture aligns with the bolt firing pin channel, said second firing pin aperture preventing passage of the firing pin for firing condition 8. A safety cam pin assembly as described in claim 3 wherein said retention means detentingly engages at least one end of the bolt firing pin channel where the latter is intersected by the bolt cam pin bore.

9. A safety cam pin assembly as described in claim 5 wherein said cam pin key means comprises a slot recess and wherein said obstruction device key means comprises at least one indexing key projectable into said cam pin slot recess.

10. A safety cam pin assembly as described in claim 6 wherein said obstruction device sleeve further includes a second firing pin aperture and when said obstruction device is in its said second position the said second firing pin aperture aligns with the bolt firing pin channel, said second firing pin aperture preventing passage of the firing pin for firing condition.

11. A safety cam pin assembly as described in claim 6 wherein said cam pin upper section is circularly cylindrical.

12. A safety cam pin assembly as described in claim 6 wherein said cam pin upper and lower sections and said obstruction device sleeve are all circularly cylindrical, and said obstruction device sleeve wall thickness is substantially equal to one half the diametrical difference between said cam pin upper and lower sections.

13. A safety cam pin assembly as described in claim 6 wherein said key means are formed at the lower ends of both said cam pin and obstruction device sleeve and interfit when said sleeve is slipped onto said shank, said cam pin being separable from said sleeve by axial movement of said cam pin shank.

14. A safety cam pin assembly as described in claim 6 wherein said obstruction device further includes retention means engageable with the rifle bolt which retains said obstruction device in the bolt in its second position when said cam pin is removed from the bolt.

15. A safety cam pin assembly as described in claim 7 wherein said obstruction device further includes retention means engageable with the rifle bolt which retains said obstruction device in the bolt in its second position when said cam pin is removed from the bolt.

16. A safety cam pin assembly as described in claim 10 wherein said obstruction device further includes retention means engageable with the rifle bolt which retains said obstruction device in the bolt in its second position when said cam pin is removed from the bolt.

17. A safety cam pin assembly as described in claim 10 wherein said cam pin upper and lower sections and said obstruction device sleeve are all circularly cylindrical, and said obstruction device sleeve wall thickness is substantially equal to one half the diametrical difference between said cam pin upper and lower sections.

18. A safety cam pin assembly as described in claim 13 wherein said cam pin key means comprises a slot recess and wherein said obstruction device key means comprises at least one indexing key projectable into said cam pin slot recess.

19. A safety cam pin assembly as described in claim 14 wherein said retention means detentingly engages at least one end of the bolt firing pin channel where the latter is intersected by the bolt cam pin bore.

* * * * *